United States Patent [19]
Shi et al.

[11] Patent Number: 6,128,948
[45] Date of Patent: Oct. 10, 2000

[54] METHODOLOGY FOR DIAGNOSING ENGINE COOLING SYSTEM WARM-UP BEHAVIOR

[75] Inventors: Guojun Shi, Wixom; James R. Yurgil, Livonia; Randall L. Gallagher, Capac, all of Mich.

[73] Assignee: General Motors Corporation, Detroit, Mich.

[21] Appl. No.: 09/249,994

[22] Filed: Feb. 16, 1999

[51] Int. Cl.$^7$ .................................................. G01M 15/00
[52] U.S. Cl. .......................................... 73/118.1; 73/117.2
[58] Field of Search ................. 73/112, 116, 117.2, 73/117.3, 118.1

[56] References Cited

U.S. PATENT DOCUMENTS

| | | | |
|---|---|---|---|
| 4,104,909 | 8/1978 | Ayers | 73/118.1 |
| 4,534,214 | 8/1985 | Takahashi | 73/118.1 |
| 5,018,484 | 5/1991 | Naitoh . | |
| 5,299,630 | 4/1994 | Schatz . | |
| 5,553,662 | 9/1996 | Longardner et al. . | |
| 5,701,852 | 12/1997 | Suzuki et al. . | |

*Primary Examiner*—Eric S. McCall
*Attorney, Agent, or Firm*—Michael J. Bridges

[57] ABSTRACT

A method for monitoring engine coolant warm-up behavior utilizing a model-based algorithm which provides a moving threshold for accumulated air or accumulated fuel entering into the engine. The algorithm allows for coolant temperature monitoring under a wide range of transient and steady state driving conditions while maintaining safeguards that prevent a false detection. The accumulated air (or fuel) delivered to the engine during the warm-up interval is used to represent the total heat generated by the engine during the warm-up interval. A time-varying moving calculated accumulated air threshold is therefore defined which can deliver accurate pass-fail decisions in conjunction with a predetermined target temperature.

20 Claims, 6 Drawing Sheets

METHODOLOGY FOR DIAGNOSING ENGINE COOLING SYSTEM WARM-UP BEHAVIOR

TECHNICAL FIELD

The present invention relates to internal combustion engine liquid cooling systems and more particularly to application of the first law of thermodynamics to on-board diagnosis of engine cooling system warm-up behavior.

BACKGROUND OF THE INVENTION

Automotive diagnostic regulations require the engine cooling system to be monitored for achieving a predetermined coolant target temperature during a predetermined engine warm-up interval. According to the regulations, the thermostat is considered malfunctioning if the coolant temperature does not reach a manufacturer-specified target temperature within a manufacturer-specified period of time after starting the engine. It is apparent that the warm-up time interval is closely related to the driving conditions and, hence, the energy generated.

In the past, a strategy was developed to monitor the coolant temperature sensor for achieving a stabilized minimum temperature level which is needed for closed loop control operation. The strategy is a three region based logic, and each region is assigned a fixed warm-up time. It does not consider any driving conditions. If the strategy is applied to thermostat monitoring, the probability of false passes and failures will be high.

Accordingly, what is needed in the art is a method whereby the engine coolant warm-up can be monitored under a wide range of transient and steady state driving conditions while maintaining safeguards that prevent a false detection, either a false pass or a false fail.

SUMMARY OF THE INVENTION

The present invention is a method for monitoring engine coolant warm-up behavior utilizing a model-based algorithm which provides a moving threshold for accumulated air or accumulated fuel entering into the engine. The algorithm allows for coolant temperature monitoring under a wide range of transient and steady state driving conditions while maintaining safeguards that prevent a false detection, either a false pass or a false fail, and results in more timely decision making than other known alternatives.

The cooling system thermostat is considered to be malfunctioning if the coolant temperature does not reach a manufacturer-specified target temperature within a manufacturer-specified interval of time after starting the engine. It is apparent that the warm-up interval is closely related to driving conditions and, hence, the energy generated by the engine. By setting a predetermined warm-up interval in terms of the accumulated air or accumulated fuel delivered to the engine, a calculated accumulated air (or fuel) threshold can then be defined for thermostat monitoring.

A mathematical model can be extracted from the experimental data to represent the coolant warm-up behavior in a compact manner. The number of calibration parameters in model-based strategies is much less than that in table-based strategies. The present thermostat diagnostic method uses a mathematical model developed to define a calculated minimum required accumulated air (or fuel) threshold.

The accumulated air (or fuel) delivered to the engine during the warm-up interval is used to represent the total heat generated by the engine during the warm-up interval. In this regard, a first part of the heat dissipation is delivered to the coolant, which is considered to be proportional to the coolant temperature increment (i.e., the target temperature minus the start-up coolant temperature). In this regard further, a second part of the heat dissipation is delivered to the outside air and the vehicle passenger compartment (i.e., when the heater is delivering heat) by convection.

The first part of the heat dissipation is linearly proportional to the coolant temperature difference (i.e., the target temperature minus the coolant start-up temperature). The second part of the heat dissipation is modeled using Newton's Law of Cooling, according to which the heat convection rate is given by:

(Convection Coefficient)*[(Target Temperature)–(Ambient Air Temperature)]

In accordance with Newton's Law of Cooling, the heat convected from the cooling system after engine start-up is defined by:

(Convection Coefficient)*[(Target Temperature)–(Ambient Air Temperature)]*(Engine Run Time)

Therefore, the accumulated air required by the engine to allow the coolant temperature to reach the target temperature is modeled as follows:

(Accumulated Air)=(Offset)+(Coefficient 1)*[(Target Temperature)–(Start-Up Coolant Temperature)]+(Convection Coefficient)*[(Target Temperature)–(Ambient Air Temperature)]*(Engine Run Time).

In that driving conditions differ, the time interval from the start-up temperature to the target temperature will be different and, hence, the heat loss by convection will be different as well. The Offset, Coefficient 1, and Convection Coefficient are calibrated based on normal cooling system data to account for these differences. The Accumulated Air is only a function of time for a given trip where Start-Up Coolant Temperature, Ambient Air Temperature, and Target Temperature are given. A time-varying moving calculated accumulated air threshold is therefore defined, which can deliver accurate pass-fail decisions in conjunction with a predetermined target temperature.

Under the following conditions a failure report will be generated: (1) The accumulated air is greater than or equal to a calculated accumulated air threshold, (2) the engine coolant temperature is below a specified target temperature, (3) the average airflow rate is greater than a specified level, (4) the engine run time is longer than the specified minimum run time, but shorter than the specified maximum run time, (5) the travel distance above a minimum vehicle speed since engine start is greater than a specified distance, and (6) the failure counter is greater than a specified number.

Under the following conditions a pass report will be generated: (1) the engine coolant temperature is higher or equal to the specified target temperature, (2) the accumulated air is less than or equal to the calculated accumulated air threshold, and (3) the engine run time is shorter than the specified maximum run time.

Accordingly, it is an aspect of the present invention to provide a monitor of engine coolant warm-up and to provide a pass or fail indication thereof based upon a predetermined model.

It is an additional aspect of the present invention to provide a model based algorithm for coolant system warm-up behavior diagnostics which provides a moving calculated accumulated air or fuel threshold, wherein pass or fail is determined by meeting a target temperature within an interval of time defined by an intersection of the actual accumulated air or fuel with the moving threshold.

These and additional aspects, advantages, features, and benefits of the present invention will become apparent from the following specification.

DESCRIPTION OF THE PREFERRED EMBODIMENT

Figure 1:
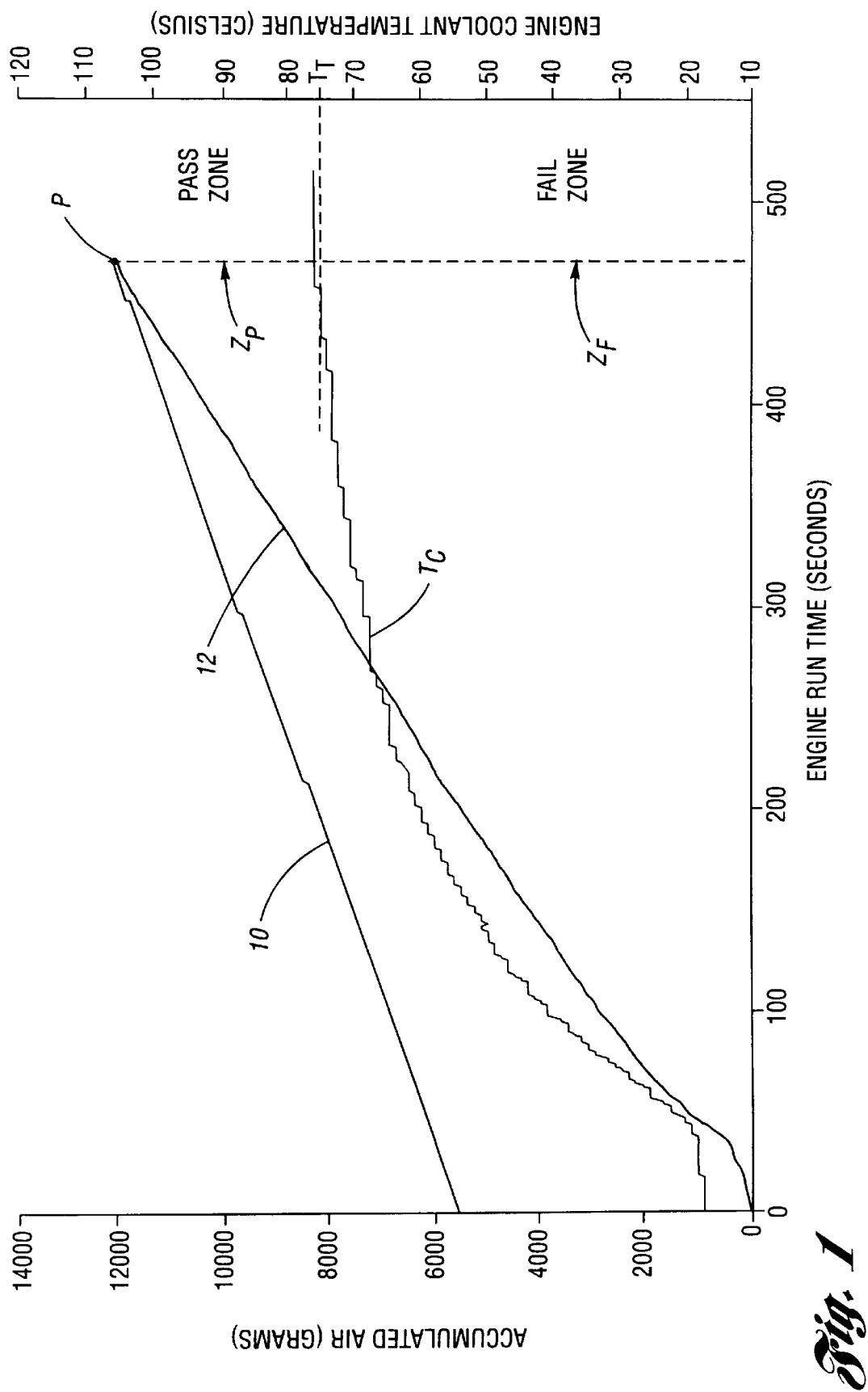
FIG. 1 depicts a graphical representation of a coolant system diagnostic test according to the present invention.

The monitored criterion for the model-based algorithm for coolant system diagnosis according to the method of the present invention can be either the accumulated air or the accumulated fuel, wherein the term "accumulated" means a total amount delivered to the engine intake. Interchangeability of the monitoring criteria is based upon the well known principles of combustion stoichiometry. Accordingly, while accumulated air is used in the following description, it is to be understood that accumulated fuel could be used alternatively.

The monitoring criterion suggested in statutory regulations is to monitor the time elapsed after engine start-up. Since the cooling system warm-up behavior is directly related to driving conditions, a proposal to use the total amount of air consumed by the engine after start-up as a monitoring criterion was consented to.

The accumulated air (or accumulated fuel) having entered into the engine is proportional to the energy released by the engine combustion process. This allows exploitation of thermodynamic principles to develop the present new cooling system diagnostic methodology as described herein.

Of the energy released through combustion, a certain portion of the total energy is distributed to the cooling system, which is proportional to the accumulated air (or fuel) that entered into the engine. The heat delivered to the cooling system is re-distributed in the form of two major heat dissipation modalities: a first heat dissipation process involving the heat needed to increase the coolant temperature from the start-up temperature to a manufacturer defined target temperature; and a second heat dissipation process involving heat convecting and radiating away from the cooling system as the vehicle is driven, wherein the radiating aspect may be ignored for purposes of implementing the present methodology. The first heat dissipation modality is linearly proportional to the coolant temperature difference (that is, the target temperature minus the start-up temperature). The second heat dissipation modality is modeled using Newton's Law of Cooling, under which the heat convection rate is given by:

(Convection Coefficient)*[(Target Temperature)−(Ambient Air Temperature)].

Accordingly, the heat convected from the cooling system after engine start up is given by:

(Convection Coefficient)*[(Target Temperature)−(Ambient Air Temperature)]*(Engine Run Time).

Therefore, the accumulated air required by the engine to cause the coolant temperature to reach the target temperature is modeled as follows:

(Accumulated Air)=(Offset)+(Coefficient 1)*[(Target Temperature)−(Start-Up Coolant Temperature)]+(Convection Coefficient)*[(Target Temperature)−(Ambient Air Temperature)]*(Engine Run Time).

Since driving conditions differ, the time interval to go from the start-up temperature to the target temperature will be different and, hence, the heat loss by convection will be different. To account for these differences, Coefficient 1 and the Convection Coefficient are predetermined weightings of the two heat distributions mechanisms, respectively, based upon normal cooling system data, wherein Coefficient 1 is defined as the heat required for the coolant temperature to increase by one degree Celsius, and the Convection Coefficient is defined as the heat transfer rate with a unit temperature difference. Theoretically, the Offset is zero; however, in real applications there are many unpredicted uncertainties and the Offset is included in order to compensate for these. The Accumulated Air is only a function of time for a given trip where Start-Up Coolant Temperature, Ambient Air Temperature, and Target Temperature are given. A time-varying moving calculated accumulated air threshold is therefore defined, which can be referenced to make accurate pass-fail decisions.

FIG. 1 gives an illustration of a coolant warm-up diagnostic pass/fail test using the model-based algorithm according to the methodology of the present invention. The target temperature $T_T$ is defined as 75° C. and the calculated accumulated air threshold 10 is moving with time. The actual accumulated air 12 is increasing with time and crosses the threshold 10 at point P, wherein the interval is approximately 460 seconds in this example. During the time interval to point P, the engine has released enough heat to the coolant such that the coolant temperature $T_C$ should be least be at least as high as the target temperature $T_T$, 75° C. in this example. If the coolant temperature $T_C$ is below the target temperature, i.e., lies in the fail zone $Z_F$, the thermostat will be failed; however, if the coolant temperature is at or above the target temperature, i.e., lies in the pass zone $Z_P$, the thermostat will be passed.

In calculating the calculated accumulated air threshold, the ambient temperature must be known. If an ambient temperature sensor is not available, which is the case for most applications, the following monotonically non-increasing ambient air temperature algorithm may be employed to estimate the ambient air temperature using intake air temperature measurements.

Figure 2:
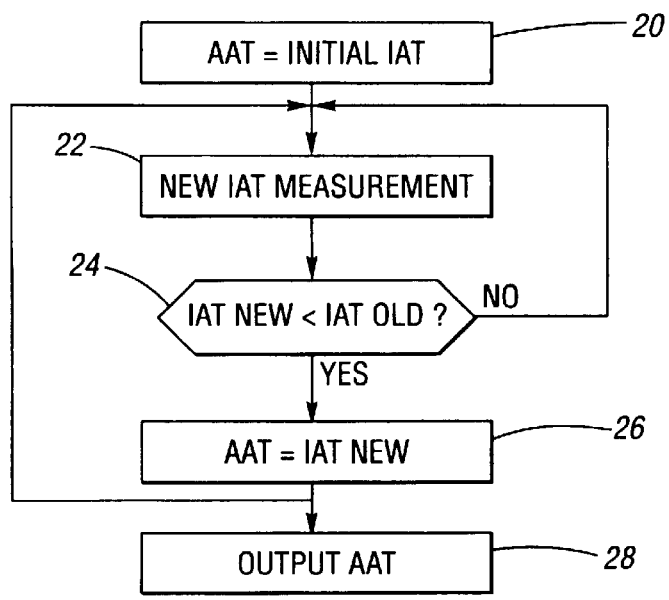
FIG. 2 depicts a block diagram for implementing an ambient air temperature algorithm according to the present invention.

FIG. 2 shows a block diagram of the ambient air temperature algorithm. Initially at execution block 20, the ambient temperature (AAT) is set equal to the intake air temperature (IAT). At execution block 22, a new IAT measurement is taken. At decision block 24, inquiry is made if the new IAT is less than the old (former) IAT. If not, a new IAT measurement is taken at block 22; if yes, then the AAT is set equal to the new IAT at execution block 26. Then, at execution block 28, a value for ambient temperature is output, and a new IAT measurement is taken at block 22.

Figure 3:
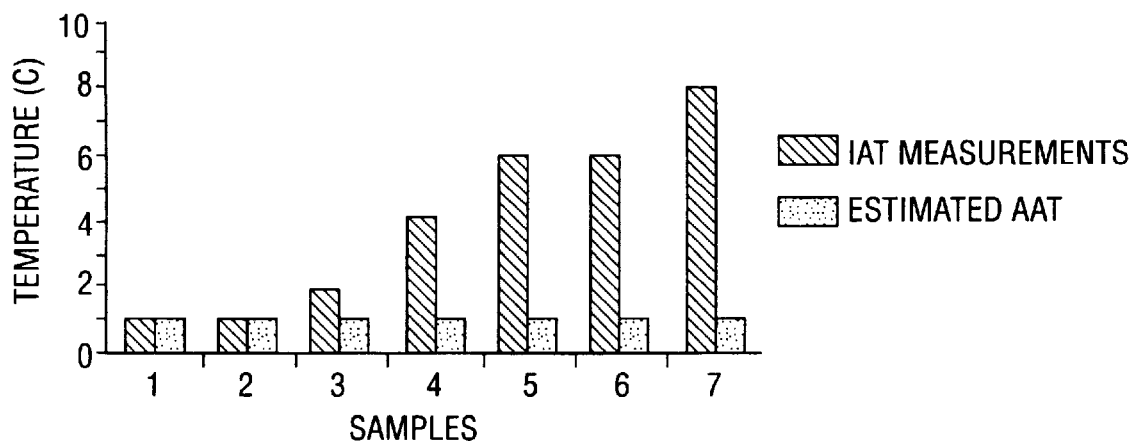
FIG. 3 depicts the result of the algorithm of FIG. 2 for a cold engine start-up.
Figure 4:
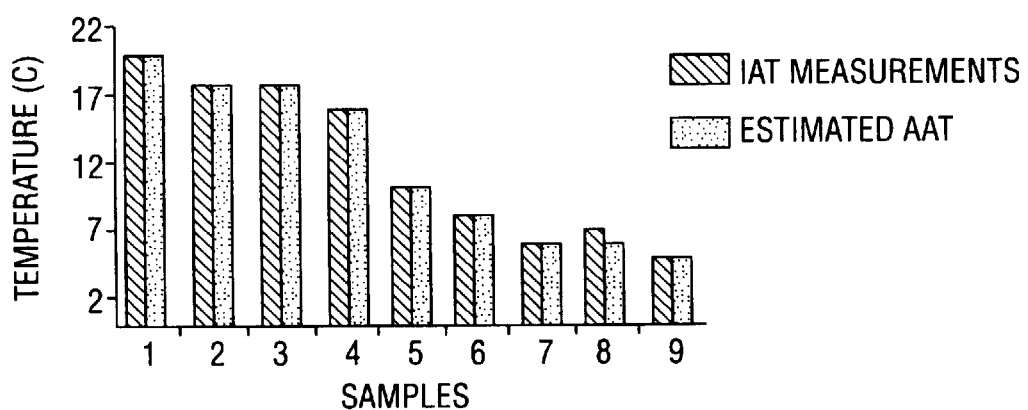
FIG. 4 depicts the result of the algorithm of FIG. 2 for a warm engine start-up.

There are two basic scenarios involving the ambient air temperature algorithm: cold engine start-up and warm engine start-up. In the case of a cold engine start, the initial IAT is very close to the AAT and the IAT will increase afterwards. The ambient air temperature algorithm takes the initial IAT as an estimate of the AAT. For the warm start-up, on the other hand, the initial IAT is usually much higher than the AAT and the IAT will drop while driving. The ambient air temperature algorithm will update the AAT estimate whenever the IAT measurement decreases. See FIG. 3 (for cold engine start-up) and FIG. 4 (for warm engine start-up) for illustrations.

Based on the applicable statutory regulations, the following enabling criteria for the coolant warm-up diagnostic according to the present invention are defined.

1. The ambient air temperature is greater than or equal to −7° C. (suggested statutorily).
2. The start-up coolant temperature is greater than −40° C. (the minimum temperature readable by the temperature sensor).
3. The maximum start-up coolant temperature is too not near the target temperature to enable the test (e.g., two degrees below the target temperature). If the start-up coolant temperature is a little bit below the target, the calibration is very difficult and many uncertainties are introduced into the diagnostic. The repeatability of the coolant warm-up behavior is poor for this temperature range. Accordingly, it is desirable to disable the test if the start up coolant temperature is little bit below the target temperature.
4. There should be a minimum engine run time to make a pass or fail decision (e.g., 30 seconds). At engine start-up, the coolant temperature either increases or dips first and then increases. This kind of warm-up behavior is difficult to predict. Accordingly, it is desirable to wait a little while to make the decision.
5. There should be a maximum engine run time to make a pass or fail decision (e.g., 22 minutes). There are two reasons for this. Firstly, since the diagnostic uses the accumulated air (or fuel) as the detection criteria, it needs a time period to time out; in other words, the diagnostic processes the whole information from engine start-up to the point of decision making, wherein the longer the monitoring time, the more uncertainty there is in the information. Accordingly, it is desirable to time out the diagnostic after a reasonable time period. Secondly, since the diagnostic normally finishes in 5 to 10 minutes, 20 minutes, for example, may be chosen as the time out for the diagnostic. The maximum run time is a calibration.
6. There should be a minimum average airflow to report a failure (e.g., 15 grams/sec.). This assures there is enough heat generated by combustion.
7. There should be a minimum distance traveled to report a failure (e.g., 2 miles). This excludes a coolant flush service situation.
8. There should be a minimum vehicle speed to accumulate the distance (e.g., 25 mph). As described hereinabove, the intake air temperature (IAT) can be used to estimate the ambient air temperature (AAT). For hot soaks, the IAT in the beginning can be very high and the vehicle needs to have enough speed to allow the ram air to blow around the engine and make the IAT close to the real AAT.
9. There should be a minimum number of consecutive failures to report a fail (e.g., five consecutive failures). This gives additional time for a pass to comprehend uncertainties and manufacturing tolerances.

Under the following conditions a failure report will be reported:

1. The accumulated air is greater than or equal to the calculated accumulated air threshold; and
2. The engine coolant temperature is below the specified target temperature; and
3. The average airflow rate is greater than the specified minimum average airflow rate; and
4. The engine run time is longer than the specified minimum run time, but shorter than the specified maximum run time; and
5. The travel distance above a minimum vehicle speed since engine start is greater than the specified distance; and
6. The failure counter is greater than the specified number.

Under the following conditions a pass report will be generated:

1. The engine coolant temperature is higher than or equal to the specified target temperature; and
2. The actual total accumulated air is less than or equal to the calculated total accumulated air threshold; and
3. The engine run time is shorter than the specified maximum run time.

It is important to again mention that in implementing the algorithm-based methodology according to the present invention, either of the following two monitoring criteria can be used: accumulated air or accumulated fuel. The monitoring period can be any sub-period between engine start-up and the point to reach the target temperature. The coolant system diagnostic according to the present invention can be used for both coolant sensor diagnostic and thermostat diagnostic.

Figure 5:
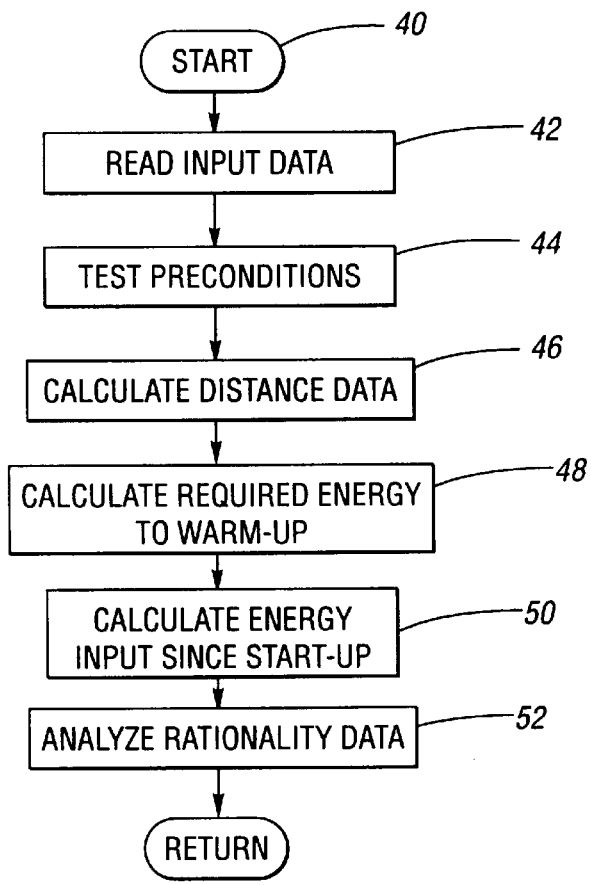
FIG. 5 depicts a block diagram for implementing the coolant system diagnostic rationality test according to the present invention.

FIG. 5 depicts a preferred example of an engine coolant warm-up behavior diagnostic methodology, employing a rationality test, according to the present invention. Engine start-up commences at block 40. Next, input data from various sensor devices is read at execution block 42, as for example engine coolant temperature, airflow, manifold air pressure, intake air temperature, vehicle speed, and crankshaft position. Next, at subroutine block 44 read data conditions are evaluated in order to determine if data analysis should be enabled. Next, vehicle distance is calculated at subroutine block 46. Then, at subroutine block 48 the energy required to warm-up the coolant is calculated, wherein a moving calculated accumulated air threshold is provided. Next, the energy input since start-up of the engine is calculated at subroutine block 50, wherein the actual accumulated air is determined. Then, rationality data is analyzed at subroutine block 52 whether to generate a pass or fail report, and the program then returns.

FIGS. 6 through 10 detail the subroutines underlying each of subroutine blocks 44 through 54.

Figure 6:
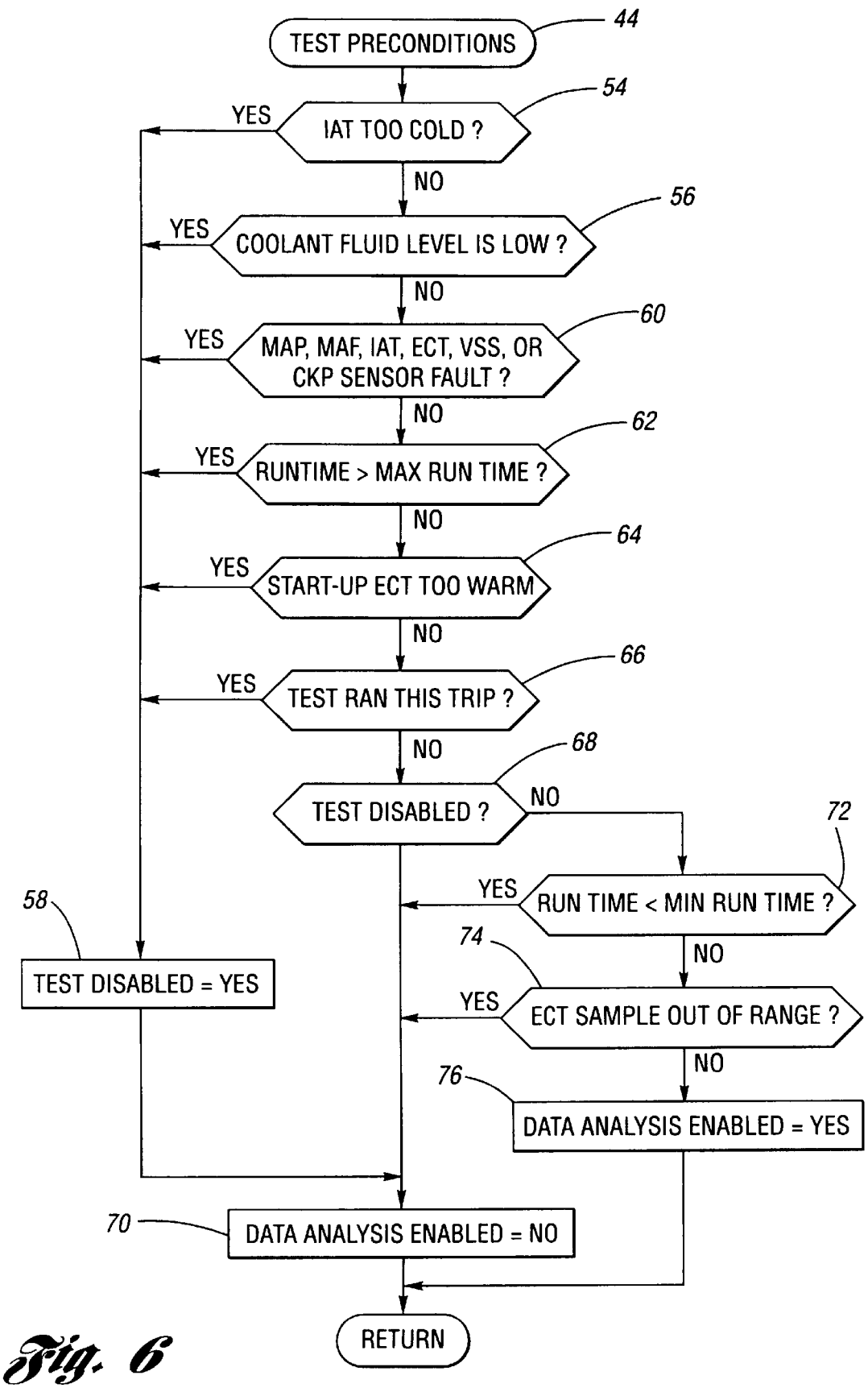
FIG. 6 depicts a block diagram for implementing the "test preconditions" block of FIG. 5.

FIG. 6 shows the process steps underlying subroutine block 44. The input data read from execution block 42 is input to decision block 54, where inquiry is made whether the intake air temperature is colder than a predetermined minimum, as for example an intake air temperature below −7° C. If the answer to the inquiry is yes, then the test is disabled at execution block 58, data analysis is not enabled at execution block 70 and the subroutine returns to the main program. If no, then inquiry is made at decision block 56 whether the coolant fluid level is low. If yes, then the test is disabled at execution block 58, data analysis is not enabled at execution block 70 and the subroutine returns to the main program. If no, then inquiry is made at decision block 60 whether there is fault with any of the sensor devices interfaced at execution block 42. If yes, then the test is disabled at execution block 58, data analysis is not enabled at execution block 70 and the subroutine returns to the main program. If yes, then inquiry is made at decision block 62 whether the engine run time has exceeded a predetermined maximum engine run time. If yes, then the test is disabled at execution block 58, data analysis is not enabled at execution block 70 and the subroutine returns to the main program. If no, then inquiry is made at decision block 64 whether the start-up engine coolant temperature is warmer than a predetermined temperature, wherein "too warm" means the engine coolant temperature at start-up is just below the target temperature (i.e., for a target temperature of 80° C., a start-up engine coolant temperature of 76° C. can be considered too warm). If the answer to the inquiry is yes, then the test is disabled at execution block 58, data analysis is not enabled at execution block 70 and the subroutine returns to the main program. If no, then inquiry is made at decision block 66 whether a prior test has already been run for this episode of engine operation. If yes, then the test is disabled at execution block 58, data analysis is not enabled at execution block 70 and the subroutine returns to the main program. If no, then inquiry is made at decision block 68 whether the test has been disabled. If yes, then data analysis is not enabled at execution block 70. If no, then inquiry is made at decision block 72 whether the engine run time is less than a minimum engine run time. If yes, then data analysis is not enabled at execution block 70 and the subroutine returns to the main program. If no, then inquiry is made at decision block 74 whether the engine coolant temperature is out of range. This inquiry originates from the coolant sensor shorts diagnostic, wherein if the engine coolant temperature is out of range, then the coolant temperature sensor has a problem and data analysis is skipped. If the inquiry at decision block 74 is yes, then data analysis is not enabled at execution block 70 and the subroutine returns to the main program. If no, then data analysis is enabled at execution block 76 and the subroutine returns to the main program.

Figure 7:
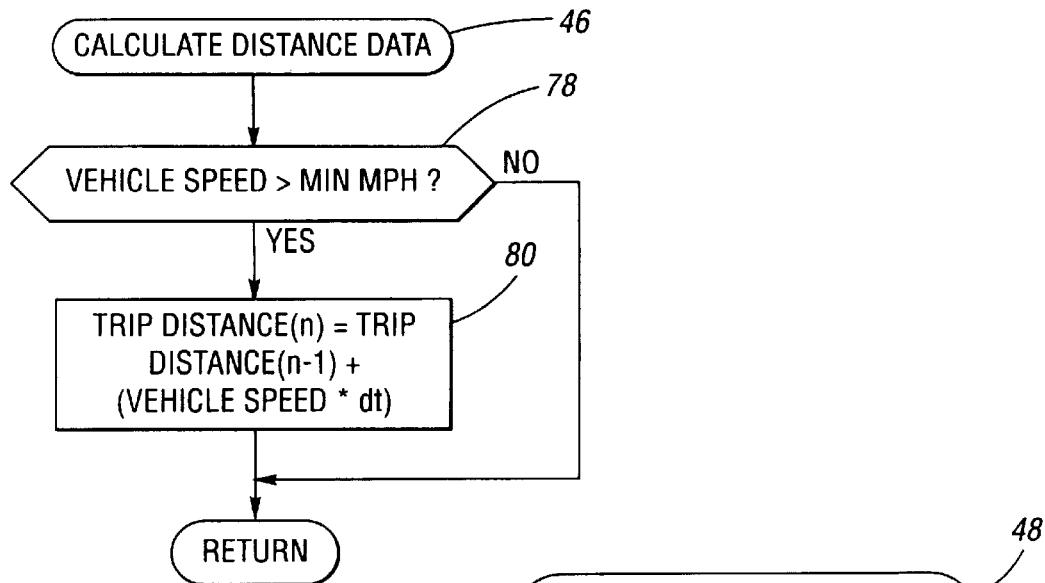
FIG. 7 depicts a block diagram for implementing the "calculate distance data" block of FIG. 5.

FIG. 7 shows the process steps underlying subroutine block 46. The output from subroutine block 44 is input to decision block 78, where inquiry is made whether vehicle speed is greater than a minimum preset value. If no, then the subroutine returns to the main program without calculating a value for trip distance. If yes, then trip distance is calculated at block 80, and the subroutine returns to the main program.

Figure 8:
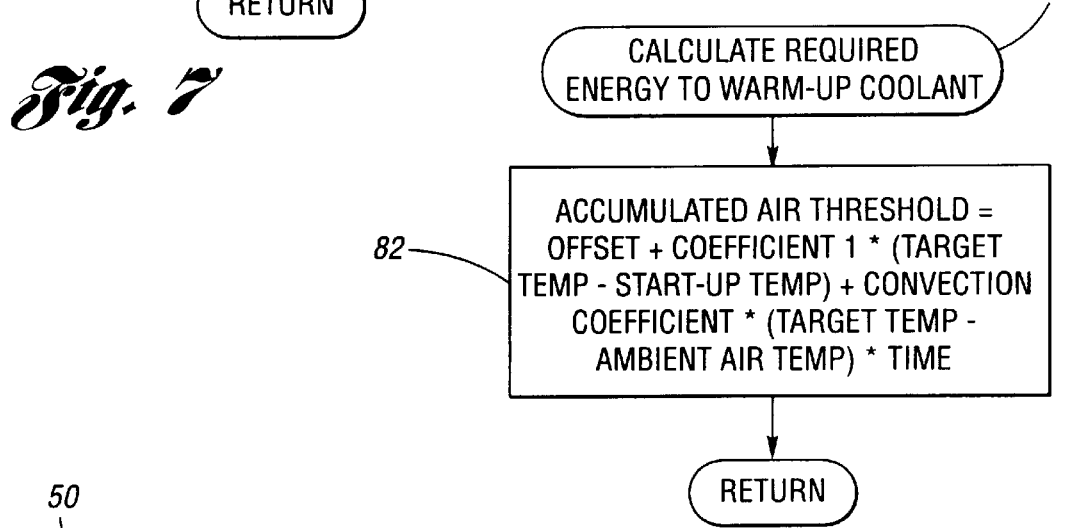
FIG. 8 depicts a block diagram for implementing the "calculate energy to warm-up coolant" block of FIG. 5.

FIG. 8 shows the process steps underlying subroutine block 48. The output from subroutine block 46 is input to execution block 82 whereat the moving accumulated air threshold is calculated, and the subroutine returns to the main program.

Figure 9:
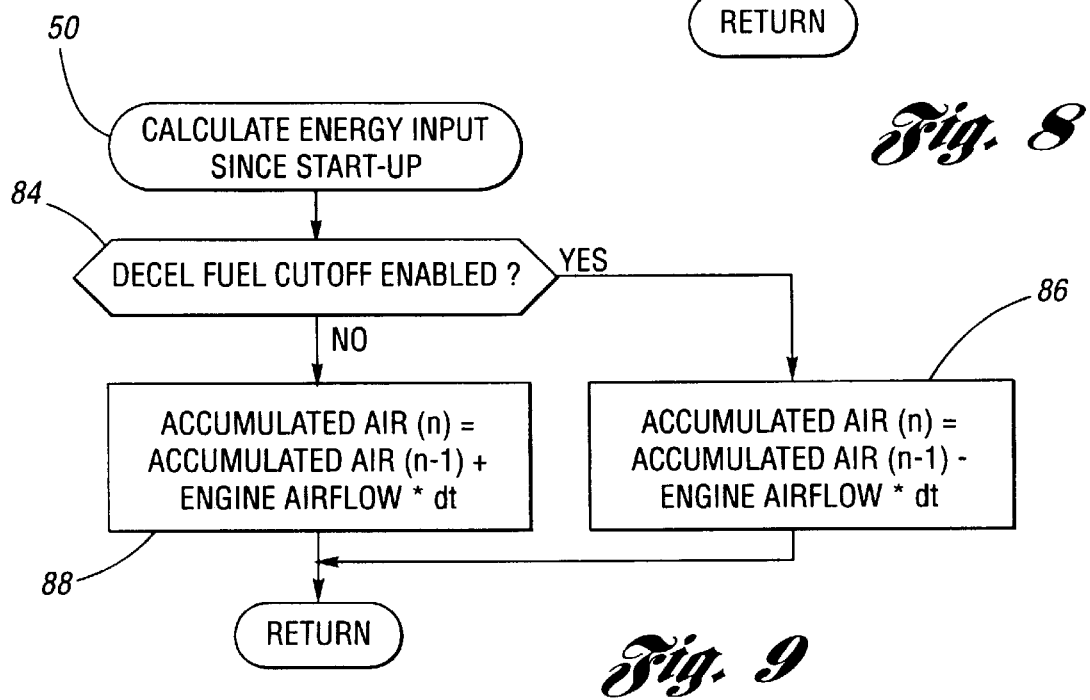
FIG. 9 depicts a block diagram for implementing the "calculate energy input since start-up" block of FIG. 5.

FIG. 9 shows the process steps underlying subroutine block 50. The output from subroutine block 48 is input to decision block 84 whereat inquiry is made whether deceleration fuel cutoff has been enabled. This pertains to engine applications where the fuel supply to the engine is cut-off during deceleration. In such an event, there is no fuel entering into the engine with the airflow, and, consequently, during this time the engine is not producing energy and the outside air is cooling the engine. Therefore, during deceleration with fuel cut-off, the airflow into the engine should be subtracted from, rather than added to, the accumulated air. If the answer is yes to the inquiry, then total accumulated air is calculated at execution block 86 and the subroutine returns to the main program. If no, then the total accumulated air is calculated at execution block 88 and the subroutine returns to the main program.

Figure 10:
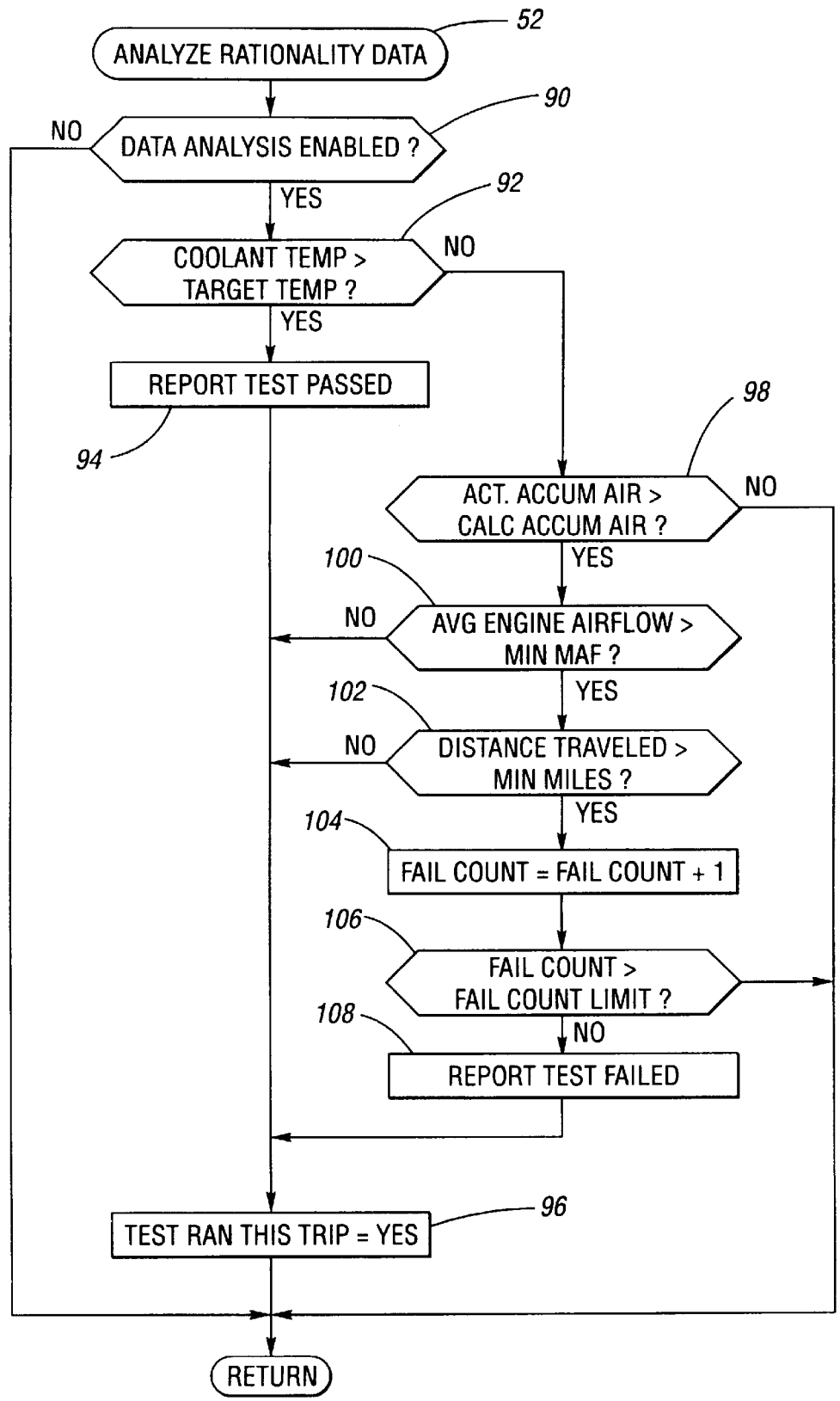
FIG. 10 depicts a block diagram for implementing the "analyze rationality data" block of FIG. 5.

FIG. 10 shows the process steps underlying subroutine block 52. The output from subroutine block 50 is input to decision block 90, where inquiry is made whether data analysis is enabled. If no, then the subroutine returns to the main program at execution block 40. If yes, then inquiry is made at decision block 92 whether the coolant temperature exceeds the target temperature. If yes, then a pass report is generated at execution block 94, the "test ran this trip" register is set to "yes" at execution block 96, and the subroutine returns to the main program. If the inquiry result is no at decision block 92, then inquiry is made at decision block 98 whether the actual accumulated air exceeds the calculated accumulated air threshold. If no, then the subroutine returns to the main program. If yes, then inquiry is made at decision block 100 whether the average engine airflow exceeds a predetermined minimum manifold airflow. If no, then the "test ran this trip" register is set to "yes" at execution block 96, and the subroutine returns to the main program. If yes, then inquiry is made at decision block 102 whether distance traveled exceeds a preset minimum number of miles. If no, then the "test ran this trip" register is set to "yes" at execution block 96, and the subroutine returns to the main program. If yes, then the "fail count" register is set to "fail count+1" at execution block 104, and inquiry is then made at decision block 106 whether the "fail count" exceeds a preset fail count limit. If no, then the subroutine returns to the main program. If yes, then a fail test report is generated at execution block 108, the "test ran this trip" register is set to "yes" at execution block 96, and the subroutine returns to the main program.

The pass or fail report may be realized by any convenient modality. For example, a pass report would not be visibly indicated, but a fail report would be visibly indicated by illumination of an indicator lamp on the dashboard reading, for example, "thermostat bad."

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A method for diagnosing warm-up behavior of a cooling system of an internal combustion engine of a vehicle upon start of the engine, comprising the steps of:
   a) setting a target temperature for a coolant of a cooling system of an engine;
   b) measuring a start-up temperature of the coolant;
   c) measuring engine run time since engine start;
   d) determining a present ambient air temperature;
   e) calculating a present threshold amount of energy needed to be produced by the engine to raise the coolant temperature from the start-up temperature to the target temperature;

f) determining a present actual amount of energy produced by the engine since engine start;

g) comparing present coolant temperature to the target temperature;

h) comparing the present threshold amount of energy to the present actual amount of energy; and i) continuously repeating steps c) through h);

wherein a pass report is generated when the present coolant temperature is at least equal to the target temperature, and the present threshold amount of energy is at least equal to the present actual amount of energy, and the engine run time is less than a predetermined maximum engine run time.

2. The method of claim 1, wherein said step d) comprises the steps of:

da) measuring an initial intake air temperature;

db) setting the present ambient air temperature equal to the initial intake air temperature;

dc) setting an old intake air temperature equal to the initial intake air temperature;

dd) measuring a present intake air temperature;

de) comparing the old intake air temperature to the present intake air temperature;

df) setting the ambient air temperature equal to the present air intake air temperature if the present air intake temperature is less than the old intake air temperature;

dg) setting the old intake air temperature equal to the present air intake temperature;

dh) repeating steps dd) through dg) to provide the present ambient air temperature.

3. The method of claim 1, further comprising between said steps c) and g) the steps of:

measuring a present flow of air into the engine; and determining a present speed of the vehicle;

wherein a fail is counted when the present airflow is above a predetermined minimum airflow, and the speed is above a predetermined minimum speed, and the distance is greater than a predetermined minimum distance, and the present coolant temperature is less than the target temperature, and the present actual amount of energy is greater than the present threshold amount of energy, and the engine run time is between a predetermined minimum run time and the maximum run time.

4. The method of claim 3, wherein when the fail count exceeds a predetermined fail count limit, a fail report is generated.

5. The method of claim 4, wherein said steps g) and h) are disabled when the present ambient air temperature is below a predetermined minimum ambient air temperature; wherein said steps g) and h) are disabled when the start-up temperature is below a minimum predetermined coolant temperature; and wherein said steps g) and h) are disabled when the start-up coolant temperature is within a predetermined minimal range with respect to the target temperature.

6. The method of claim 5, further comprising between steps c) and g) the step of sensing fuel cut-off, wherein airflow into the engine during fuel cut-off is subtracted from said present accumulated air.

7. The method of claim 3, wherein said step e) comprises the steps of:

setting a predetermined offset;

setting a predetermined coefficient 1; and setting a predetermined convection coefficient;

wherein the present threshold amount of energy is defined as a present accumulated air threshold calculated by adding the offset to the product of coefficient 1 times the difference between the target temperature and the start-up temperature and adding thereto the product of the convection coefficient times the difference between the target temperature and the present ambient air temperature by the convection coefficient;

wherein the present actual amount of energy is defined as a present accumulated air that has flowed into the engine; and wherein said step h) comprises comparing the present accumulated air threshold to the present accumulated air.

8. The method of claim 7, further comprising between steps c) and g) the step of sensing fuel cut-off, wherein airflow into the engine during fuel cut-off is subtracted from said present accumulated air.

9. The method of claim 8, wherein said steps g) and h) are disabled when the present ambient air temperature is below a predetermined minimum ambient air temperature; wherein said steps g) and h) are disabled when the start-up temperature is below a minimum predetermined coolant temperature; and wherein said steps g) and h) are disabled when the start-up coolant temperature is within a predetermined minimal range with respect to the target temperature.

10. The method of claim 9, wherein when the fail count exceeds a predetermined fail count limit, a fail report is generated.

11. The method of claim 10, wherein said step d) comprises the steps of:

da) measuring an initial intake air temperature;

db) setting the present ambient air temperature equal to the initial intake air temperature;

dc) setting an old intake air temperature equal to the initial intake air temperature;

dd) measuring a present intake air temperature;

de) comparing the old intake air temperature to the present intake air temperature;

df) setting the ambient air temperature equal to the present air intake air temperature if the present air intake temperature is less than the old intake air temperature;

dg) setting the old intake air temperature equal to the present air intake temperature;

dh) repeating steps dd) through dg) to provide the present ambient air temperature.

12. A method for diagnosing warm-up behavior of a cooling system of an internal combustion engine of a vehicle upon start of the engine, comprising the steps of:

a) setting a target temperature for a coolant of a cooling system of an engine;

b) measuring a start-up temperature of the coolant;

c) measuring engine run time since engine start;

d) determining a present ambient air temperature;

e) measuring a present flow of air into the engine;

f) determining a present speed of the vehicle;

g) calculating a present threshold amount of energy needed to be produced by the engine to raise the coolant temperature from the start-up temperature to the target temperature;

h) determining a present actual amount of energy produced by the engine since engine start;

i) comparing present coolant temperature to the target temperature;

j) comparing the present threshold amount of energy to the present actual amount of energy; and k) continuously repeating steps c) through j);

wherein a pass report is generated when the present coolant temperature is at least equal to the target temperature, and the present threshold amount of energy is at least equal to the present actual amount of energy, and the engine run time is less than a predetermined maximum engine run time;

wherein a fail is counted when the present airflow is above a predetermined minimum airflow, and the speed is above a predetermined minimum speed, and the distance is greater than a predetermined minimum distance, and the present coolant temperature is less than the target temperature, and the present actual amount of energy is greater than the present threshold amount of energy, and the engine run time is between a predetermined minimum run time and the maximum run time; and wherein when the fail count exceeds a predetermined fail count limit, a fail report is generated.

13. The method of claim 12, wherein said steps i) and j) are disabled when the present ambient air temperature is below a predetermined minimum ambient air temperature; wherein said steps i) and j) are disabled when the start-up temperature is below a minimum predetermined coolant temperature; and wherein said steps i) and j) are disabled when the start-up coolant temperature is within a predetermined minimal range with respect to the target temperature.

14. The method of claim 13, further comprising between steps c) and g) the step of sensing fuel cut-off, wherein airflow into the engine during fuel cut-off is subtracted from said present accumulated air.

15. The method of claim 14, wherein said step g) comprises the steps of:

setting a predetermined offset;

setting a predetermined coefficient 1; and setting a predetermined convection coefficient;

wherein the present threshold amount of energy is defined as a present accumulated air threshold calculated by adding the offset to the product of coefficient 1 times the difference between the target temperature and the start-up temperature and adding thereto the product of the convection coefficient times the difference between the target temperature and the present ambient air temperature by the convection coefficient;

wherein the present actual amount of energy is defined as a present accumulated air that has flowed into the engine; and wherein said step j) comprises comparing the present accumulated air threshold to the present accumulated air.

16. The method of claim 15, wherein said step d) comprises the steps of:

da) measuring an initial intake air temperature;

db) setting the present ambient air temperature equal to the initial intake air temperature;

dc) setting an old intake air temperature equal to the initial intake air temperature;

dd) measuring a present intake air temperature;

de) comparing the old intake air temperature to the present intake air temperature;

df) setting the ambient air temperature equal to the present air intake air temperature if the present air intake temperature is less than the old intake air temperature;

dg) setting the old intake air temperature equal to the present air intake temperature;

dh) repeating steps dd) through dg) to provide the present ambient air temperature.

17. A method for diagnosing warm-up behavior of a cooling system of an internal combustion engine of a vehicle upon start of the engine, comprising the steps of:

a) setting a target temperature for a coolant of a cooling system of an engine;

b) measuring a start-up temperature of the coolant;

c) measuring engine run time since engine start;

d) determining a present ambient air temperature;

e) measuring a present flow of air into the engine;

f) determining a present speed of the vehicle;

g) calculating a present threshold amount of energy needed to be produced by the engine to raise the coolant temperature from the start-up temperature to the target temperature;

h) determining a present actual amount of energy produced by the engine since engine start;

i) comparing present coolant temperature to the target temperature;

j) comparing the present threshold amount of energy to the present actual amount of energy; and k) continuously repeating steps c) through j);

wherein said step g) comprises the steps of:

setting a predetermined offset;

setting a predetermined coefficient 1; and setting a predetermined convection coefficient;

wherein the present threshold amount of energy is defined as a present accumulated air threshold calculated by adding the offset to the product of coefficient 1 times the difference between the target temperature and the start-up temperature and adding thereto the product of the convection coefficient times the difference between the target temperature and the ambient air temperature by the convection coefficient;

wherein the present actual amount of energy is defined as a present accumulated air that has flowed into the engine;

wherein said step j) comprises comparing the present accumulated air threshold to the present accumulated air;

wherein a pass report is generated when the present coolant temperature is at least equal to the target temperature, and the present threshold amount of energy is at least equal to the present actual amount of energy, and the engine run time is less than a predetermined maximum engine run time;

wherein a fail is counted when the present airflow is above a predetermined minimum airflow, and the speed is above a predetermined minimum speed, and the distance is greater than a predetermined minimum distance, and the present coolant temperature is less than the target temperature, and the present actual amount of energy is greater than the present threshold amount of energy, and the engine run time is between a predetermined minimum run time and the maximum run time; and wherein when the fail count exceeds a predetermined fail count limit, a fail report is generated.

18. The method of claim 17, wherein said step d) comprises the steps of:

da) measuring an initial intake air temperature;

db) setting the present ambient air temperature equal to the initial intake air temperature;

dc) setting an old intake air temperature equal to the initial intake air temperature;

dd) measuring a present intake air temperature;

de) comparing the old intake air temperature to the present intake air temperature;

df) setting the ambient air temperature equal to the present air intake air temperature if the present air intake temperature is less than the old intake air temperature;

dg) setting the old intake air temperature equal to the present air intake temperature;

dh) repeating steps dd) through dg) to provide the present ambient air temperature.

19. The method of claim 17, wherein said steps i) and j) are disabled when the present ambient air temperature is below a predetermined minimum ambient air temperature; wherein said steps i) and j) are disabled when the start-up temperature is below a minimum predetermined coolant temperature; and wherein said steps i) and j) are disabled when the start-up coolant temperature is within a predetermined minimal range with respect to the target temperature.

20. The method of claim 17, further comprising between steps c) and g) the step of sensing fuel cut-off, wherein airflow into the engine during fuel cut-off is subtracted from said present accumulated air.

* * * * *